United States Patent [19]

El-Hindi

[11] 4,137,169
[45] Jan. 30, 1979

[54] LIQUID FILTRATION SYSTEM

[75] Inventor: Ahmad M. El-Hindi, Fabius, N.Y.

[73] Assignee: Filter Tech, Inc., Manlius, N.Y.

[21] Appl. No.: 741,537

[22] Filed: Nov. 12, 1976

[51] Int. Cl.² .............................................. B01D 29/02
[52] U.S. Cl. ...................................... 210/97; 210/400; 210/406; 210/416 R
[58] Field of Search .................. 210/83, 103, 104, 141, 210/142, 387, 400, 401, 406, 73, 222, 97, 416

[56] References Cited

U.S. PATENT DOCUMENTS

| 2,664,203 | 12/1953 | Crane et al. | 210/387 |
|---|---|---|---|
| 2,665,812 | 1/1954 | Crane | 210/387 |
| 3,332,553 | 7/1967 | Cassan | 210/103 |
| 3,426,908 | 2/1969 | Daus et al. | 210/406 |
| 3,464,563 | 9/1969 | Dahlem et al. | 210/400 |
| 3,618,772 | 11/1971 | Dietrick | 210/387 |
| 3,690,466 | 9/1972 | Lee et al. | 210/406 |
| 3,704,787 | 12/1972 | Norton | 210/387 |
| 3,876,547 | 4/1975 | Kaess | 210/387 |
| 3,912,632 | 10/1975 | Winzon | 210/387 |

Primary Examiner—Theodore A. Granger
Attorney, Agent, or Firm—Charles S. Mc Guire

[57] ABSTRACT

A liquid filtration system for separating contaminants from liquids such as coolants used in maching operations. The invention provides the following: (a) filtration apparatus wherein filtered liquid may be withdrawn at a substantially constant rate from a chamber, although supplied thereto at a variable rate, by means of a level-responsive throttling valve in the line to the vacuum pump; (b) the invention is concerned with filtration apparatus employing parallel endless chains with transverse flights which support and transport a strip of filter material in such a way that the length remains constant (i.e., the material is not stretched or contracted) although the chains and material follow a longitudinally curved path; (c) means for scavenging liquid from the filter cake of contaminants which collect on the surface of a movable filter element; (d) cooperative mechanical and liquid means for maintaining a seal at the lateral edges of a conveyor and strip of filter material which separate a vacuum chamber from atmospheric pressure; and (e) a method for separating both floating and non-floating contaminants by providing liquid to a filtration chamber at a faster rate than it is removed through a perforate filter element upon which the non-floating contaminants are deposited, thereby producing an overflow of liquid and floating contaminants which is collected and skimmed.

4 Claims, 7 Drawing Figures

LIQUID FILTRATION SYSTEM

BACKGROUND OF THE INVENTION

The present invention relates to liquid filtration and, more specifically, to methods and apparatus for removing contaminants from liquids used as coolants and lubricants in maching operations.

Among the filtration systems commonly used to purify liquids for recycling in machine tool operations are those employing endless chain conveyors which move through a tank to which contaminated liquid is supplied for filtration through a perforate filter material. Contaminants are deposited on the surface of the filter material as the liquid passes through, resulting in a bed or "cake" of contaminants which is removed either by scraping it from the surface of a stationary filter element with scraper element attached to the conveyor, or by attaching the filter element to the conveyor and periodically moving it to position a fresh portion of filter material in the tank to perform the filtration operation.

As the thickness of the filter cake increases filtering efficiency is enhanced by retaining smaller particles on the upper surface of the filter element, but the flow rate through the filter element is decreased if the pressure differential remains constant. Thus, in order to operate at an acceptable flow rate while still maintaining a high filtering efficiency the vacuum in the lower chamber must be increased. This is also affected by the rate of removal of filtered liquid from the vacuum chamber, which is usually desirable to maintain at a substantially constant rate. One of the principal objects of the invention is to provide filtering apparatus of the above-described type having novel and improved means for controlling the vacuum in the lower chamber to allow pumping of filtered liquid therefrom at a substantially constant rate.

In filtration apparatus employing a movable filter element, the latter may be carried upon or otherwise moved by an endless belt made up of a pair of parallel chains, having pivotally attached links, connected by transverse bars. In applications wherein the filter element is carried upon the transverse bars, it is stretched and/or contracted as the endless belt passes around sprockets and other curves and bends in its path of movement. These changes in the length of the filter material seriously impair its functional capabilities. Another major object of the present invention is to provide an endless belt carrying a length of flexible filter material which is not subject to stretching or contraction as it follows the curved path of the belt.

In many applications the liquid may include both non-floating contaminants, such as metal chips and turnings, and floating contaminants, such as tramp oil. A further object of the present invention is to provide a unique method of separating both floating and non-floating contaminants from a liquid in filtration apparatus of the general type described above.

As a movable filter element emerges from the filtration tank, the filter cake contains significant quantities of entrapped liquid. It is desirable to recover this liquid, rather than discarding it with the filter cake, for eventual reuse in the process. A still further object of the invention is to provide means for scavenging purified liquid from a filter cake upon withdrawal of the filter element carrying the cake from the filtration tank.

The significant pressure differential maintained across the filter element in apparatus of this type by pumping clean liquid from the chamber below the filter element requires a seal to be maintained along the lateral edges of the filter element and in other areas where air at atmospheric pressure may enter the vacuum chamber. Still another object of the present invention is to provide novel and improved structure for maintaining a positive seal along the lateral edges of a filter element separating chambers at different pressures.

SUMMARY OF THE INVENTION

In accordance with the foregoing objects, the invention comprises filtration apparatus having a tank into which contaminated liquid from a work area is placed. The upper portion of the tank, which receives the contaminated liquid, is separated from a lower chamber by a filter element carried on an endless belt. Foreign matter is removed from the liquid and retained on the upper surface of the filter element as the liquid passes therethrough.

A unique combination of mechanical and liquid seals are provided to allow a sub-atmospheric pressure to be maintained in the lower compartment, thereby increasing the flow rate of liquid through the filter element. A vacuum pump evacuates air from an upper portion of the vacuum chamber to provide the desired pressure differential. In one embodiment, filtered liquid is removed from the vacuum chamber by gravity drain and in another embodiment by being forcibly pumped therefrom. In the latter case, a throttling valve is provided in the line between the upper portion of the chamber and the vacuum pump and is responsive to the liquid level in the upper portion of the chamber. Movement of the filter element by means of the endless belt may also be responsive to the same liquid level.

A plurality of spaced carrier bars extend transversely between the parallel chains of the conveyor to support the endless belt which in turn supports the filter element or media, as is conventional. In the present invention, the bars are affixed to links of the chains with the surface supporting the endless belt flush with the pitch lines of the chains. In this manner, the filter media is not stretched or compressed as it changes direction with the curved path of travel of the chains.

As the filtration process is carried out, contaminated liquid is supplied to the upper portion of the tank at a faster rate than the liquid passes through the filter element. This creates an overflow condition whereby floating contaminants are carried out of the tank. The overflowing liquid is collected in another compartment and the floating contaminants removed with conventional skimmer means.

DETAILED DESCRIPTION

The filtration apparatus of the invention may be incorporated in a variety of systems which separate solids and other foreign matter from a process liquid. The liquid and/or solids may then be recovered for reuse in the same or other processes. A common example, which is one of the principal intended uses of the invention, is the recovery of liquid used to cool and lubricate the work in metal drilling, grinding, shaping, and other machining operations.

Figure 1:
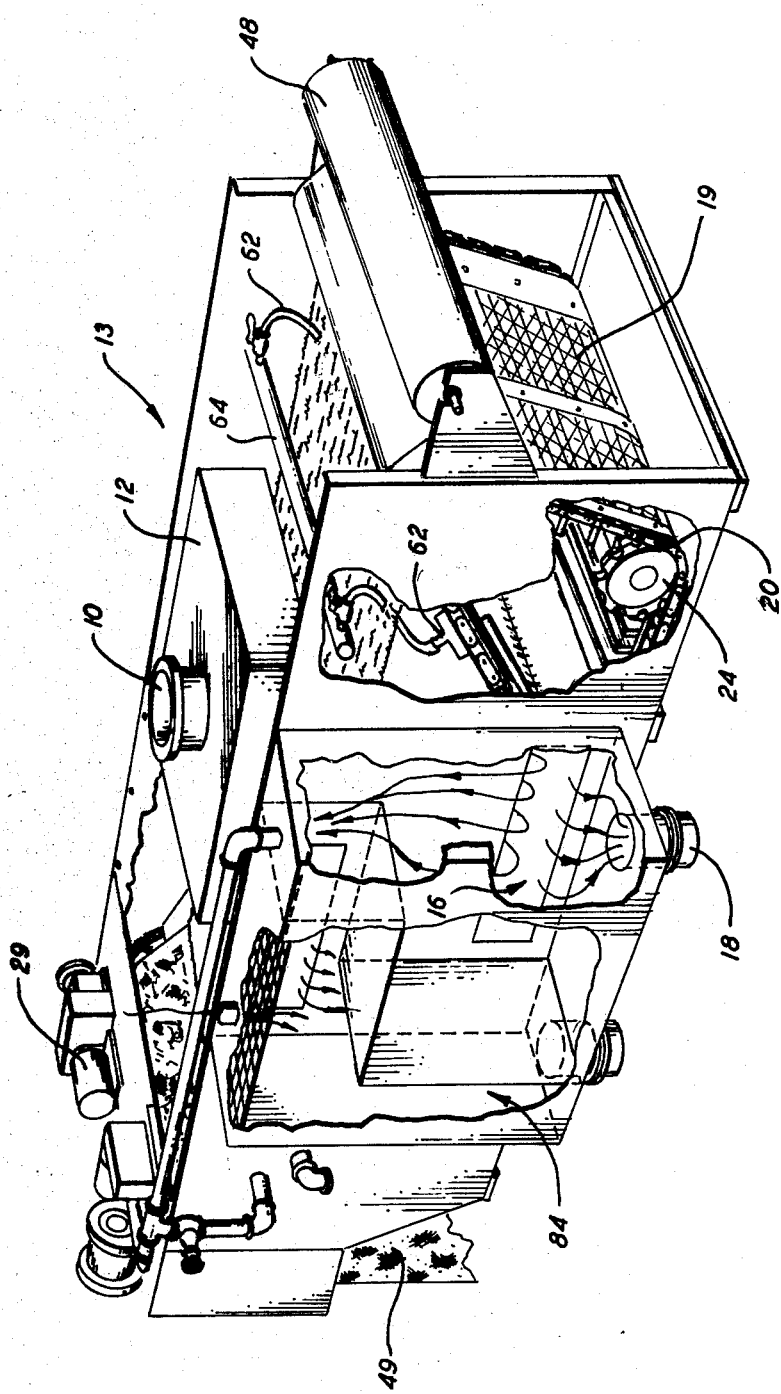
FIG. 1 is a perspective view of filtration apparatus embodying features of the present invention, with certain portions broken away.
Figure 2:
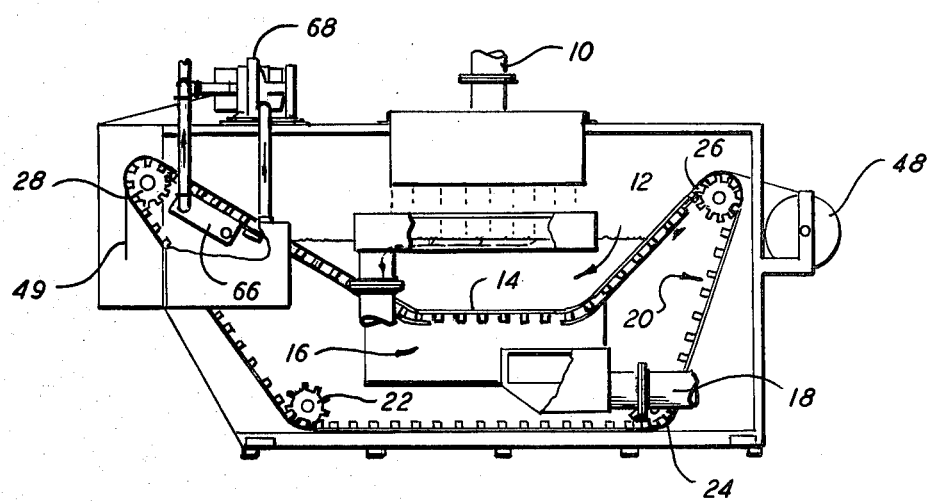
FIG. 2 is a side elevational view of the filtration apparatus, the majority of the view being in vertical section through the center, and other portions being broken away.

Referring now to the drawings, the overall structure and function of the filtration apparatus is shown in FIGS. 1 and 2.

Contaminated liquid is delivered through inlet 10 to distribution chamber 12 and is deposited in the upper, open portion of tank 13 which is separated by horizontally disposed filter element 14 from vacuum chamber 16. Solids and other non-floating contaminants are removed from the liquid as it passes through filter element 14 and is pumped or drained from chamber 16 through outlet 18. The clean liquid may then be returned for reuse in the manufacturing process wherein it is used.

Filter element 14 is carried by an endless mesh belt 10 attached to a chain conveyor, generally denoted in FIGS. 1 and 2 by reference numeral 20 and having a construction explained in more detail hereinafter. Conveyor 20 includes a pair of spaced, parallel chains which pass over idler sprockets 22, 24 and 26 and drive sprocket 28, being movable by the latter in a counter-clockwise direction as shown in FIG. 2.

As liquid passes downwardly from the upper portion of tank 13 to chamber 16, solids are retained on the upper surface of filter element 14. As the solids build up to form a filter cake or sludge cake the filtration efficiency is enhanced (i.e., increasingly smaller particles will be retained in the upper compartment) but lower pressure (i.e., a greater vacuum) is required to pull the liquid through the filter cake and element to vacuum chamber 16. When the pressure differential between chambers 12 and 16 reaches a predetermined value, as determined by a conventional sensing mechanism (not shown) or other control means, described later in more detail, power to motor 29 (FIG. 1), which rotates drive sprocket 28, is switched on. Conveyor 20 is moved until the pressure differential is reduced to a desired level by positioning a fresh portion of filter element 14 above chamber 16.

Figure 3:
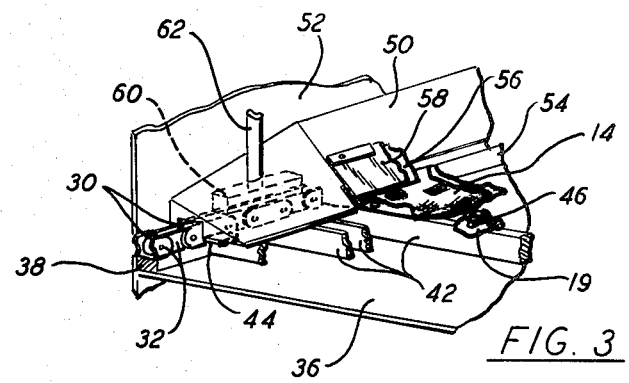
FIG. 3 is a fragmentary, perspective view of selected portions of the filtration apparatus.
Figure 5:
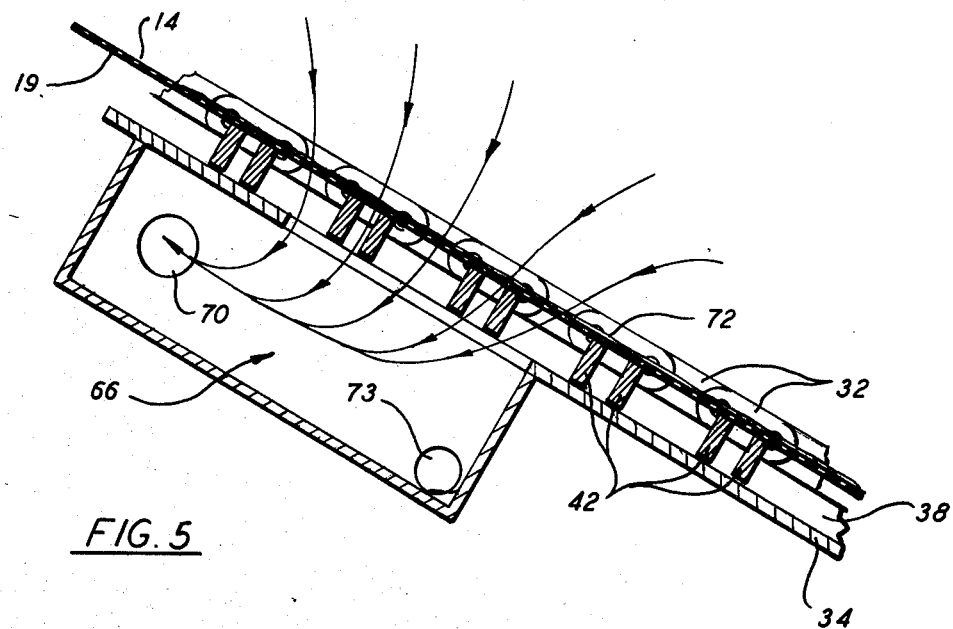
FIG. 5 is a fragmentary, side, sectional view of still another portion of the apparatus.

One of the chains, as well as other elements of conveyor 20, are shown in more detail in FIGS. 3 and 5. The chain is composed of rollers 30, pivotally connected by links 32, having a height slightly less than the diameter of the rollers. Thus, the chains are of the so-called oversized roller type, with the peripheries of the rollers being supported by and moving upon an underlying support.

Figure 4:
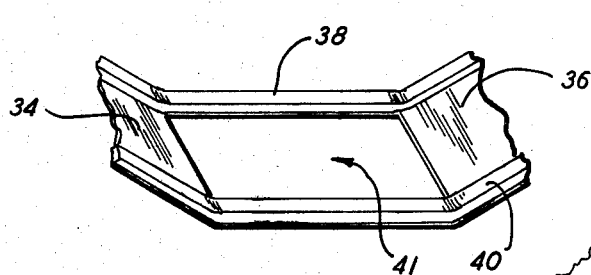
FIG. 4 is a fragmentary, perspective view of another portion of the apparatus.

The structure of the support for the upper reach of the conveyor chains is shown in FIG. 4. The support is attached to the side wall of tank 13. Solid, planar portions 34 and 36 form inclined ramps for the conveyor as it enters and exits the fluid-filled upper portion of tank 13. Side tracks 38 and 40 support the rollers at each side of portions 34 and 36, and extend horizontally therebetween to form central opening 41, where the upper and lower portions of tank 13 are separated only by filter element 14.

Referring again to FIG. 3, carrier bars 42 are attached at each end to elements 44 extending from links 32 at spaced intervals along the chains. As previously mentioned endless belt 19 is supported by carrier bars 42 and is permanently attached thereto at a number of locations around the entire length of conveyor 20 by fastener means 46. The material of filter element 14 may be of reusable media from which the filter cake is removed after exiting the liquid-filled chambers, in which case the media is attached to the endless belt around its entire periphery. Alternatively, filter element 14 may be of the disposable media type, as shown, supplied from roll 48 supported adjacent the upper end of conveyor 20 which is moved toward the liquid filled portion of tank 13. In this case the media is not attached directly to the endless belt or conveyor and is discarded as the conveyor passes over drive sprocket 28 and begins its downward travel, as indicated at 49.

It will be noted from FIGS. 3 and 5 that carrier bars 42 are attached to the chains with the surface which supports filter element 14 (or, more precisely, the endless belt upon which the filter element rests) flush with the pitch lines of the chains (i.e., the lines intersecting the pivotal axes of the connections of the links and rollers). This important feature greatly enhances the performance of the filter element by maintaining its length constant over the full path of its travel. If, for example, the surfaces of the carrier bars supporting the filter element were substantially in the plane of one side of the chains, as is conventional, the filter element (media) would be stretched in one direction as the conveyor passed over the sprockets, and compressed in the opposite direction as it changed directions in entering and leaving the horizontal portion of its travel above chamber 16. Such stretching and compression would impair, and eventually destroy, the filtering capability of the media. Although this feature is of special importance when reusable media is employed, it is also useful even with disposable media since several changes of direction occur in the path of media travel before it is discarded.

The pressure differential on opposite sides of the filter element will tend to draw air into chamber 16 upper to the lower side of the filter media. This is undesirable, of course, since it tends to destroy the vacuum in chamber 16 which serves to maintain the desired flow of liquid through filter element 14. The filtering apparatus of the present invention provides a unique combination of mechanical and liquid seals so that a high vacuum may be maintained, permitting higher flow rates through the filter media or greater filtering efficiency, or both.

Seal support 50 is fixedly attached to wall 52 of tank 13, along the entire length of the upper portion of the tank from points above the liquid level at each end. The side edges of belt 19 and filter element 14 are distorted at support 50 out of the plane of the remainder of the filter element to pass between the upper surface of support 50 and stationary seal member 56. The latter is a strip of rubber, or the like, urged by hold-down spring 58 into engagement with reinforced edge portion 54 of belt 19 and the overlying edge of filter element 14. Seal member 56 and spring 58 are fixedly attached to seal support 50. The chain passes between wall 52 and a cut-out portion of seal support 50, and carrier bars 42 pass under the seal support.

While the mechanical edge seal described above will effectively prevent air from entering chamber 16 by passing around the edges of filter element 14, air will also tend to be drawn in through the cut-out portions of seal supports 50 through which the conveyor chains travel, and under carrier bars 42. To prevent this condition, liquid seals are provided which flood these areas with filtered liquid. A portion of seal support 50 is provided with hollow chamber 60 which communicates directly with the cut-out portion through which the conveyor chain travels. Inlet 62 to chamber 60 is connected to manifold 64 (FIG. 1) which receives filtered liquid from chamber 16. Liquid is supplied to chamber 60 at a rate in excess of that required to keep the chain cavities of seal supports 50 filled. The excess liquid tends to travel laterally, following the lower edges of carrier bars 42 as the latter pass adjacent chamber 60. Bars 42 are dimensioned to fit closely between side rails 38 and 40 at each end and in close proximity to planar portions 34 and 36 of the conveyor support structure, as seen in FIG. 5. The excess liquid flowing out of the chain cavities of seal supports 50 substantially blocks flow of air at atmospheric pressure into chamber 16 under carrier bars 42. This combination of liquid and mechanical seals allow a high pressure differential to be maintained across filter element 14, thus increasing the flow rate of liquid through the filter element and/or increasing filtration efficiency by generating a thicker filter cake on the upper surface of the filter element. The liquid seal shown in FIG. 3 is identical at all four sealing locations, i.e., at both sides of the conveyor below where it enters and on both sides where it leaves the upper portion of tank 13 containing contaminated liquid.

Means are also provided in the filtration apparatus of the invention for extracting as much as possible of the liquid retained in the filter cake after it emerges from chamber 12. Enclosed plenum chamber 66 is supported below the filter element in the position indicated in FIG. 1 and is shown in more detail in FIG. 4. A suitable pump or other vacuum producer 68 (FIGS. 1 & 2) is connected through opening 70 to the interior of chamber 66. As air is evacuated from chamber 66, atmospheric air will flow into the chamber through the only path available, i.e., through filter cake 72 and filter element 14, as indicated by the arrows in FIG. 5. The air stream will pick up droplets of the liquid contained in filter cake 72 as it passes therethrough. The liquid thus extracted from filter cake 72 is drained from chamber 66 through opening 73, thereby recovering liquid which would otherwise be discarded with the filter cake.

Figure 6:
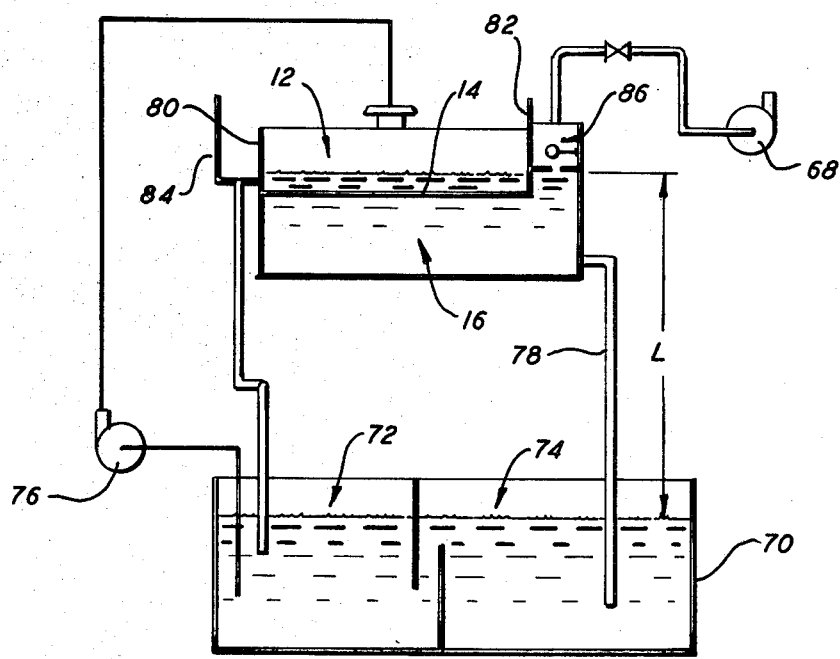

Referring now to FIG. 6, the apparatus of the invention is shown somewhat diagrammatically in end section in a position elevated above a service tank 70 having areas 72 and 74 for contaminated and clean (filtered) liquids, respectively. Feed pump 76 delivers contaminated liquid from area 72 to the upper portion of tank 13. The liquid passes through filter element 14 in the manner previously described to vacuum chamber 16, from which it is drained through outlet 18 to pipe 78 which discharges into area 74 of tank 70.

In some applications of the invention the contaminants may include floating foreign matter, such as tramp oil or other light, immiscible fluids which should be separated from the process fluid being filtered. In such cases, pump 76 is regulated to deliver fluid to chamber 12 at a faster rate than it passes through filter element 14, thus creating an overflow condition. It will be noted in FIG. 6 that side wall 80 of upper chamber 12 is lower than side wall 82. Thus, liquid overflowing side wall 80 will carry with it an appreciable portion of the floating contaminants. An appropriate collecting chamber 84 (see also FIG. 1) is provided for return of the overflowed liquid to contaminated area 72 of service tank 70. Conventional skimmers (not shown) may be used to remove the floating contaminants from the surface of the liquid in area 72. Vacuum pump 68 evacuates air from the upper portion of enclosed chamber 86, with which chamber 16 communicates along one side. The absolute pressure above the liquid in chamber 86 is somewhat lower than that above the liquid surface (and below filter element 14) in chamber 16. Thus, the level of the liquid in chamber 86 is higher than in chamber 16 and is maintained so that the height L of the fluid column is equal to that necessary to drain the filtered liquid under vacuum.

Figure 7:
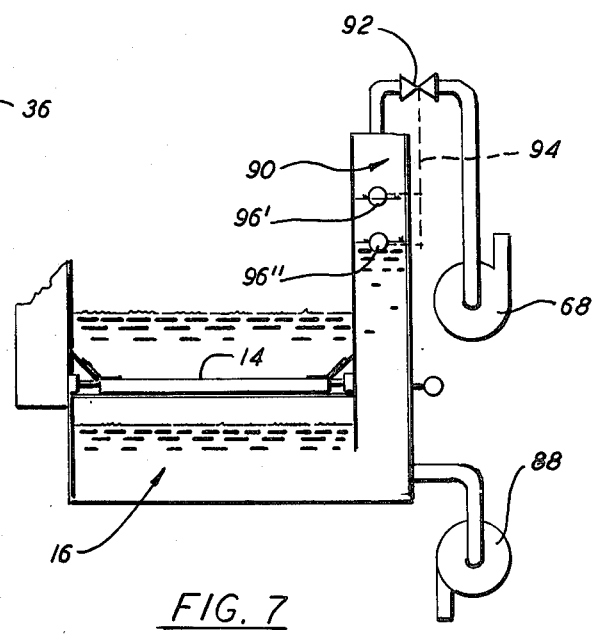
FIGS. 6 and 7 are somewhat diagrammatic, sectional, end elevations illustrating alternate embodiments of means for removing filtered liquid from the apparatus.

In some installations, the vertical space required for gravity drain as shown in FIG. 6, is not available, or forced drain (by pump) of chamber 16 may be desirable for other reasons. In such applications, as shown diagrammatically in FIG. 7, pump 88 is connected to inlet 18 of the vacuum chamber to discharge the filtered liquid therefrom. Vacuum pump 68 is again connected to evacuate air from the upper portion of chamber 90, with which chamber 16 communicates. A float or other level-responsive mechanism within chamber 86 is connected to valve 92, as indicated by dotted line 94, in the line through which vacuum pump 68 and chamber 90 communicate. When the liquid level in chamber 90 is at the position indicated by reference numeral 96', valve 92 is throttled down to decrease or shut off the evacuation of air by pump 68. As the level of liquid drops to the position indicated at 96", valve 92 is opened to increase the rate at which air is removed by vacuum pump 68 from chamber 90.

The control of vacuum in accordance with the liquid level in chamber 90 provides the important advantage of allowing withdrawal of filtered liquid from chamber 16 at a substantially constant rate even though the rate of liquid supply thereto is variable. That is, while pump 88 is removing liquid from vacuum chamber 16 at a constant rate, liquid enters chamber 16 at a rate dependent upon the head of liquid above filter element 14, the thickness and permeability of the filter cake, and other factors. In such applications, power to motor 29 is preferably controlled in accordance with the liquid level in chamber 90. That is, when the filter cake on element 14 impedes the flow into chamber 16 to the extent that the level in chamber 90 falls to some predetermined level, in addition to opening valve 92.

What is claimed is:

1. In filter apparatus for separating solid contaminants from liquids of the type having a tank defining an upper compartment with a liquid inlet and a lower compartment with a liquid outlet in fluid communication with said upper compartment, and an endless, flexible, liquid-permeable filter element supported for movement in a path between said upper and lower compartments and separating said upper and lower compartments to allow passage of liquid through said filter element from said upper to said lower compartment, the improvement therein of means for withdrawing filtered liquid at a substantially constant rate, said means comprising:

(a) pump means for removing liquid through said outlet at a substantially constant rate, thereby forming a first vacuum chamber in a portion of said lower compartment immediately below said filter element;

(b) a vacuum compartment in fluid communication at its lower end with said lower compartment and constructed and arranged with its upper end providing a second vacuum chamber above the level of said first vacuum chamber;

(c) a vacuum pump;

(d) a conduit connecting said vacuum pump with said second vacuum chamber for evacuating air therefrom;

(e) a throttle valve in said conduit; and (f) liquid level sensing means in said upper end of said vacuum compartment constructed and arranged to reduce the opening of said throttle valve in response to rise of the liquid level in said vacuum compartment upper end and to increase the opening of said throttle valve in response to lowering of the liquid level in said vacuum compartment upper end.

2. Filter apparatus for separating solid contaminants from liquids comprising:

(a) a tank having an upper compartment with a liquid inlet and a lower compartment with a liquid outlet in fluid communication with said upper compartment;

(b) an endless, flexible, liquid-permeable filter element supported for movement in a path between said upper and lower compartments and separating said upper and lower compartments to allow passage of liquid through said filter element from said upper to said lower compartment whereby a filter cake of solid contaminants collects on one surface of said filter element, said path including an upwardly inclined end portion;

(c) an enclosed plenum chamber positioned beneath said upwardly inclined end portion of said filter element path; and (d) a vacuum pump communicating with said chamber for evacuating air therefrom to apply a vacuum on the side of said filter element opposite said one surface, thereby drawing air and liquid through said filter cake and filter element to extract from said filter cake a substantial portion of the moisture retained therein after leaving said upper compartment.

3. In filter apparatus for separating solid contaminants from liquids of the type having a tank defining an upper compartment with a liquid inlet and a lower compartment with a liquid outlet in fluid communication with said upper compartment and an endless, flexible, liquid-permeable filter element supported for movement in a path between said upper and lower compartments and separating said upper and lower compartments to allow passage of liquid through said filter element from said upper to said lower compartment; the improvement comprising:

(a) resilient seal elements fixedly supported upper support members within said upper compartment and extending over the lateral edges of said filter element to engage the latter firmly but movably between said support members and seal elements;

(b) means defining a hollow chamber with an open bottom communicating with said lower compartment located at each end of said upper chamber at opposite side edges of said filter element and positioned above said side edges; and (c) means providing a continuous supply of liquid to said chambers at a rate sufficient to maintain said chambers completely full of liquid at all times, thereby forming a liquid seal at said filter element side edges.

4. The invention according to claim 3 and further including conveyor means supporting and moving said filter element and having a plurality of spaced, transverse bars, said upper compartment having planar portions extending between said opposite side edges in the area of said hollow chambers, said bars moving in close proximity to said planar portions, and said hollow chambers communicating with said upper compartment for flow of the liquid supplied to said chambers into the spaces between said planar portions and the bars moving adjacent said hollow chambers.

* * * * *